UNITED STATES PATENT OFFICE.

GEORGE EDWARD HEYL-DIA, OF WARRINGTON, ENGLAND.

PROCESS OF DEVULCANIZING VULCANIZED INDIA-RUBBER SCRAP.

SPECIFICATION forming part of Letters Patent No. 689,616, dated December 24, 1901.

Application filed June 11, 1901. Serial No. 64,188. (No specimens.)

*To all whom it may concern:*

Be it known that I, GEORGE EDWARD HEYL-DIA, engineer, a subject of the King of Great Britain, residing in Warrington, in the county of Lancaster, England, (whose full postal address is Birk Crag, 286 Great Clowes street, Higher Broughton, Manchester, in the county of Lancaster, England,) have invented certain new and useful Improvements in Processes of Devulcanizing Vulcanized India-Rubber Scrap, of which the following is a specification.

This invention has for its object the devulcanization of ordinary vulcanized rubber, more especially scrap.

The rubber, preferably cut up into small pieces, is first submitted in an iron or other suitably-closed tank to the action of solvents—such as naphtha, benzol, spirits of turpentine, or other suitable solvents capable of dissolving sulfur, but not of dissolving india-rubber at the heat employed. The tank is heated, but to a heat not exceeding the volatilizing-point of the respective solvents at the pressure used and not exceeding 120° Fahrenheit. In order to prevent the pressure in the vessel rising to too great a degree, a stand-pipe cooled by water and connected with the upper portion is connected to the vessel, so that the solvent-vapors rising from the mixture are condensed and run back into the tank. The result of this working is that the bulk of the sulfur contained in the vulcanized rubber is dissolved out into the solvent, while the rubber remains practically untouched, the temperature being too low to dissolve the rubber. After the digesting process has been carried on for several hours the solvent is drawn off from the tank and submitted to a distilling process, when the solvent is recovered, and the sulfur remains in the retort as solid crystals. If the rubber be not entirely devulcanized, a fresh batch of solvent is admitted to the tank. It is obvious that the tank can be of any length, and if a long narrow tank be used I may make a continuous process of it by drawing the solvent from one end, distilling it, and sending the vapors or the distilled solvent back into the tank at the other end, the rubber being passed through the tank in the reverse direction and removed from time to time at one end, while fresh rubber is added at the other.

The devulcanized rubber formed in the above manner is suitable for spreading or for other purposes. If a continuous process be not used, the devulcanized material while still remaining in the tank is covered with fresh solvent and the tank then exposed to heat not exceeding 350° Fahrenheit and pressure preferably not exceeding forty-five pounds on the square inch, and by this means a solution of india-rubber is obtained. This solution can be used as it is, or it may be dried in the following manner, so as to be worked up again into a solid-rubber sheet: A temperature considerably above the volatilizable point of the solvent used is applied, and the result is that the solvent is slowly distilled over and is condensed in a condenser for reuse. When the dissolved india-rubber has been brought down to a soft plastic state, it will be found impracticable to continue the distillation any further except by increasing the heat to such a degree as would destroy or injure the india-rubber. When therefore the material arrives at the soft plastic state, it is passed to a closed kneading-machine, where it is kneaded with hot water, the water being kept at a boiling temperature, or at any rate sufficiently hot to evaporate the solvent. The rubber is thus left behind without a trace of solvent. It is taken out, dried, and is ready for use.

I declare that what I claim is—

1. The process of obtaining ordinary india-rubber from vulcanized rubber, which consists in cutting up the vulcanized rubber into small pieces, heating it with a solvent of sulfur such as described, at or about the volatilizable point of the solvent until the sulfur is dissolved out but maintaining the solvent in a liquid state throughout the heating, drawing off the solvent, treating the india-rubber in a similar way with further solvents until all the sulfur is dissolved out, and distilling the solvent separately, whereby solvents for reuse and sulfur, are obtained in separate forms.

2. The improvement in the process of devulcanizing india-rubber, which consists in heating the same with such solvent of sulfur as will not at the heat used dissolve the india-rubber, the solvent being maintained in a liquid state throughout the heating.

3. The improvement in the process of obtaining india-rubber from vulcanized india-rubber scrap, which consists in dissolving out the sulfur by means of a solvent and heat at a temperature not exceeding 120° Fahrenheit, separating the liquid from the india-rubber and dissolving the recovered rubber in fresh solvent, whereby a solution of unvulcanized india-rubber is obtained.

4. The improvement in the process of obtaining solid unvulcanized india-rubber from devulcanized india-rubber scrap, which consists in separating the sulfur from the vulcanized scrap by means of solvents and heat, dissolving the purified rubber in fresh solvent distilling off a portion of the solvent, and then kneading the remainder with hot water in a closed chamber, whereby the remaining solvent is evaporated and can be condensed.

5. The improvement in the process of treating a solution of india-rubber for obtaining a solid therefrom, which consists in slowly distilling the same until it arrives in the soft plastic state, and then kneading the same in hot water, whereby the remaining solvent is driven off, and then drying, substantially as described.

In witness whereof I have hereunto signed my name, this 31st day of May, 1901, in the presence of two subscribing witnesses.

GEORGE EDWARD HEYL-DIA.

Witnesses:
AUSTIN W. MEDLEY,
SIDNEY W. DOD.